United States Patent
Lau

(10) Patent No.: US 10,296,445 B2
(45) Date of Patent: May 21, 2019

(54) AUTOMATED SYSTEM DOCUMENTATION GENERATION

(71) Applicant: CA, Inc., Islandia, NY (US)

(72) Inventor: Rich J. Lau, Deer Park, NY (US)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 14/852,598

(22) Filed: Sep. 13, 2015

(65) Prior Publication Data

US 2017/0075798 A1  Mar. 16, 2017

(51) Int. Cl.
*G06F 11/36* (2006.01)
*G06F 8/73* (2018.01)
*G06F 11/30* (2006.01)
*G06F 17/27* (2006.01)

(52) U.S. Cl.
CPC ............ *G06F 11/3688* (2013.01); *G06F 8/73* (2013.01); *G06F 11/30* (2013.01); *G06F 11/368* (2013.01); *G06F 11/3664* (2013.01); *G06F 17/278* (2013.01)

(58) Field of Classification Search
CPC ........ G06F 11/3688; G06F 8/73; G06F 11/30; G06F 17/278; G06F 11/3664; G06F 11/368
USPC ....................................... 717/125; 714/38.14
See application file for complete search history.

(56) References Cited

U.S. PATENT DOCUMENTS

| | | | |
|---|---|---|---|
| 5,345,587 A | 9/1994 | Fehskens et al. | |
| 5,450,586 A | 9/1995 | Kuzara et al. | |
| 5,576,965 A | 11/1996 | Akasaka et al. | |
| 6,122,627 A | 9/2000 | Carey et al. | |
| 6,134,540 A | 10/2000 | Carey et al. | |
| 6,810,368 B1 | 10/2004 | Pednault | |
| 6,879,946 B2 | 4/2005 | Rong et al. | |
| 6,883,162 B2 | 4/2005 | Jackson et al. | |
| 6,957,199 B1 | 10/2005 | Fisher | |
| 7,376,549 B2 | 5/2008 | Horikawa | |
| 7,437,710 B2 | 10/2008 | Bau et al. | |

(Continued)

OTHER PUBLICATIONS

Wikipedia, "Mock Object," Sep. 23, 2008, printed May 31, 2009, http://en.wikipedia.org/wiki/Mock_object, pp. 1-5.

(Continued)

*Primary Examiner* — Wei Y Zhen
*Assistant Examiner* — Mohammed Huda
(74) *Attorney, Agent, or Firm* — Alliance IP, LLC

(57) ABSTRACT

A transaction is initiated that involves a plurality of software components in a system. Transaction data is received from a plurality of agents instrumented on at least a subset of software components in the plurality of software components, the transaction data describing attributes of a plurality of fragments of the transaction observed by the plurality of agents. Each transaction fragment includes a respective request and a corresponding response communicated between two software components in the plurality of software components. From the transaction data, a flow of the transaction is determined that describes an order of the transaction fragments and involvement of respective software components in each transaction fragment. Documentation is generated from the transaction data, the documentation describing the system and including a representation of a functional architecture of the system based on the determined flow.

18 Claims, 12 Drawing Sheets

(56) References Cited

U.S. PATENT DOCUMENTS

| | | | |
|---|---|---|---|
| 7,487,508 B2 | 2/2009 | Fu et al. |
| 7,539,980 B1 | 5/2009 | Bailey et al. |
| 7,552,036 B2 | 6/2009 | Oslake et al. |
| 7,676,538 B2 | 3/2010 | Potter et al. |
| 7,783,613 B2 | 8/2010 | Gupta et al. |
| 7,805,496 B2 | 9/2010 | Aiber et al. |
| 7,873,594 B2 | 1/2011 | Harada et al. |
| 7,966,183 B1 | 6/2011 | Kryskow et al. |
| 8,060,864 B1 | 11/2011 | Michelsen |
| 8,112,262 B1 | 2/2012 | Michelsen |
| 8,538,740 B2 | 9/2013 | Kumar et al. |
| 8,898,681 B1 | 11/2014 | Acheff et al. |
| 8,935,573 B2 | 1/2015 | Horsman et al. |
| 9,201,767 B1 | 12/2015 | Tarlton et al. |
| 9,323,645 B2 | 4/2016 | Michelsen |
| 9,531,609 B2 | 12/2016 | Talot et al. |
| 2002/0010781 A1 | 1/2002 | Tuatini |
| 2003/0055670 A1 | 3/2003 | Kryskow et al. |
| 2003/0217162 A1 | 11/2003 | Fu et al. |
| 2004/0078782 A1 | 4/2004 | Clement et al. |
| 2004/0128259 A1 | 7/2004 | Blakeley et al. |
| 2004/0162778 A1 | 8/2004 | Kramer et al. |
| 2004/0230674 A1 | 11/2004 | Pourheidari et al. |
| 2004/0243334 A1 | 12/2004 | Wrigley et al. |
| 2004/0243338 A1 | 12/2004 | Sabiers et al. |
| 2005/0027648 A1 | 2/2005 | Knowles et al. |
| 2005/0063335 A1 | 3/2005 | Shenfield et al. |
| 2005/0166094 A1* | 7/2005 | Blackwell et al. ........... G06F 11/3688 714/38.14 |
| 2005/0198401 A1 | 9/2005 | Chron et al. |
| 2005/0289231 A1 | 12/2005 | Harada et al. |
| 2006/0224375 A1 | 10/2006 | Barnett et al. |
| 2006/0235675 A1 | 10/2006 | Oslake et al. |
| 2007/0006177 A1 | 1/2007 | Aiber et al. |
| 2007/0033442 A1 | 2/2007 | Tillmann et al. |
| 2007/0073682 A1 | 3/2007 | Adar et al. |
| 2007/0169003 A1 | 7/2007 | Branda et al. |
| 2007/0261035 A1 | 11/2007 | Duneau |
| 2007/0277158 A1 | 11/2007 | Li et al. |
| 2008/0010074 A1 | 1/2008 | Brunswig et al. |
| 2008/0120129 A1 | 5/2008 | Seubert et al. |
| 2008/0127093 A1 | 5/2008 | Fernandez-Ivern et al. |
| 2009/0064149 A1 | 3/2009 | Singh et al. |
| 2009/0094684 A1 | 4/2009 | Chinnusamy et al. |
| 2009/0119301 A1 | 5/2009 | Cherkasova et al. |
| 2009/0187534 A1 | 7/2009 | Broil et al. |
| 2009/0204669 A1 | 8/2009 | Allan |
| 2009/0234710 A1 | 9/2009 | Hassine et al. |
| 2009/0282403 A1 | 11/2009 | Poole et al. |
| 2009/0298458 A1 | 12/2009 | Bakker et al. |
| 2010/0037100 A1 | 2/2010 | Lopian |
| 2010/0145962 A1 | 6/2010 | Chen et al. |
| 2010/0318974 A1 | 12/2010 | Hrastnik et al. |
| 2012/0059868 A1 | 3/2012 | Buckl et al. |
| 2012/0084754 A1 | 4/2012 | Ziegler et al. |
| 2014/0108589 A1 | 4/2014 | Dhanda |
| 2014/0223418 A1 | 8/2014 | Michelsen et al. |
| 2015/0205699 A1 | 7/2015 | Michelsen |
| 2015/0205700 A1 | 7/2015 | Michelsen |
| 2015/0205701 A1 | 7/2015 | Michelsen |
| 2015/0205702 A1 | 7/2015 | Michelsen |
| 2015/0205703 A1 | 7/2015 | Michelsen |
| 2015/0205708 A1 | 7/2015 | Michelsen |
| 2015/0205712 A1 | 7/2015 | Michelsen |
| 2015/0205713 A1 | 7/2015 | Michelsen |
| 2016/0125052 A1 | 5/2016 | Dahan et al. |
| 2016/0239409 A1 | 8/2016 | de Oliveira Staudt et al. |

OTHER PUBLICATIONS

Lisa, 2.0 User's Guide, Interactive TKO, Feb. 27, 2003, pp. 1-130.
Lisa, 2.0 Developer's Guide, Interactive TKO, Mar. 13, 2003, pp. 1-23.
Chapter 5—Service Discovery, Bluetooth Application Developer's Guide, 2002 (pp. 167-209).
Chatterjee, S., "Messaging Patterns in Service-Oriented Architecture, Part 1," msdn.microsoft.com/en-us/library/aa480027.aspx, Apr. 2004, (pp. 1-21).
Time to live—Wikipedia, the free encyclopedia; 2015; pp. 1-3. http://en.wikipedia.org/wikiiTime_to_live>, examiner annotated document.
Web Discussion: "Is TCP protocol stateless or not?" available online at "http://stackoverflow.conn/questions/19899236/is-tcp-protocol-statelessor-not" pp. 1-3 (2013).

* cited by examiner

AUTOMATED SYSTEM DOCUMENTATION GENERATION

BACKGROUND

The present disclosure relates in general to the field of computer systems analysis, and more specifically, to automatically inspecting computer software system architecture.

Modern distributed software systems can enable transactions that cross system and network boundaries, with backend systems communicating with additional backend systems to generate results or provide a service for a client. As an example, online travel reservation systems often involve a frontend website with which users interact on their browser. To search for and complete a reservation in response to a user's request, the host of the travel reservation site may interact with other backend services, including services and systems provided by third parties, such as airlines, car rental companies, hotel companies, credit card payment systems, and so on. These third party services may, themselves, also communicate with and consume services of still further systems, resulting in a chain of transactions and dependencies in response to a single user's request. Additionally, each system itself may be composed of multiple different sub-systems, or components, that interact with each other (and even other systems) in different ways depending on the transaction.

While the breadth and sophistication of the services provided by distributed systems continues to expand and enrich users' lives, the complexity of these systems, their components, and their interoperation also increases. Indeed, it is not uncommon for multiple different enterprises and their systems to be involved in a single transaction. Even within transaction performed by a single entity's system, the multiple composite components of that system are often developed by and "owned" by distinct development teams, with few if any developers or administrators having an in-depth global knowledge of the system and all of its composite parts. This can pose a challenge to developers and administrators as they seek to modify, update, test, verify, and develop components for such software systems.

BRIEF SUMMARY

According to one aspect of the present disclosure, a transaction can be initiated that involves a plurality of software components in a system. Transaction data can be received from a plurality of agents instrumented on at least a subset of software components in the plurality of software components, the transaction data describing attributes of a plurality of fragments of the transaction observed by the plurality of agents. Each transaction fragment can include a respective request and a corresponding response communicated between two software components in the plurality of software components. From the transaction data, a flow of the transaction can be determined that describes an order of the transaction fragments and involvement of respective software components in each transaction fragment. Documentation can be generated from the transaction data, the documentation describing the system and including a representation of a functional architecture of the system based on the determined flow.

BRIEF DESCRIPTION OF THE DRAWINGS

Like reference numbers and designations in the various drawings indicate like elements.

DETAILED DESCRIPTION

Figure 1:
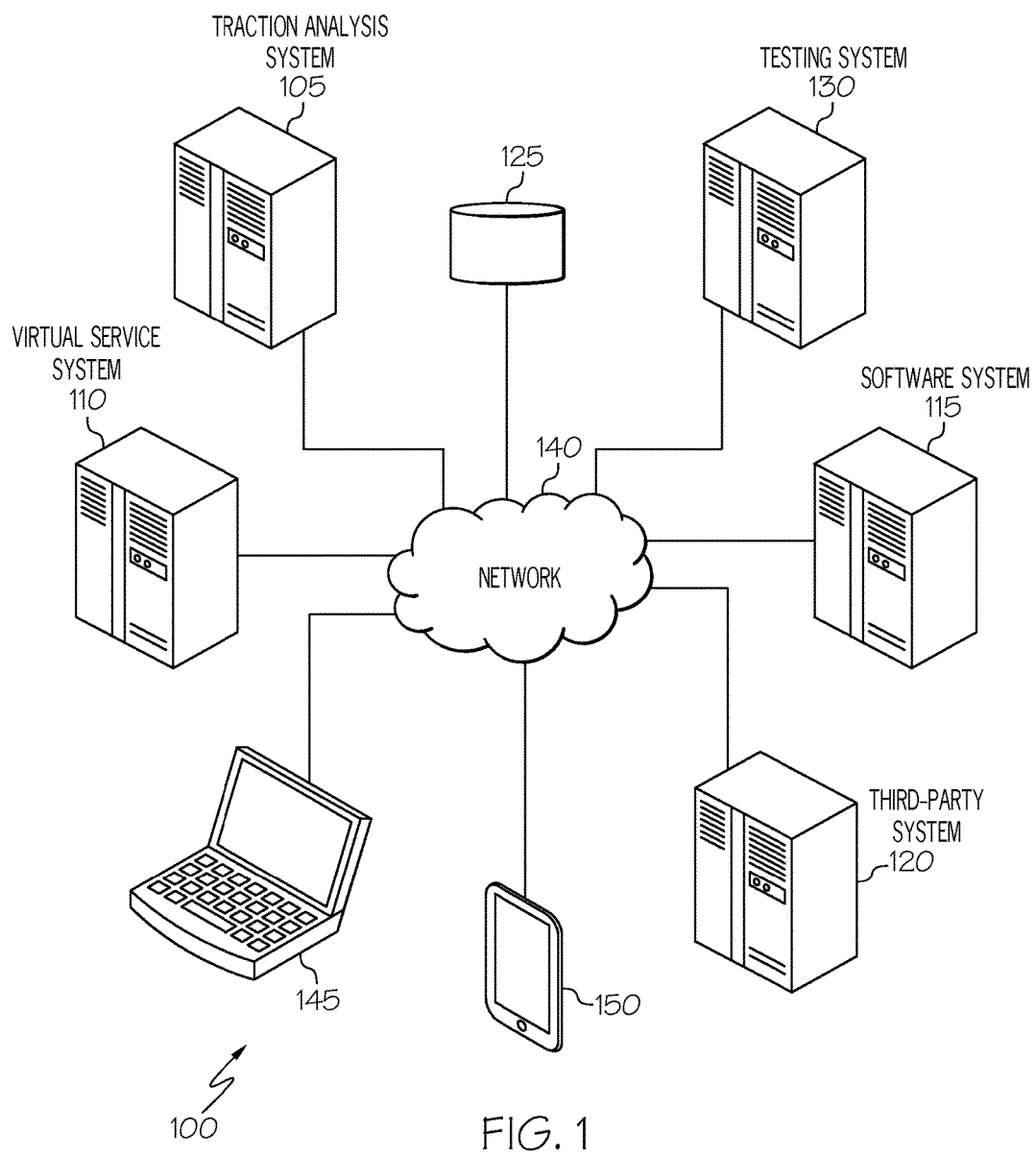
FIG. 1 is a simplified schematic diagram of an example computing system including an example transaction analysis system in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, a simplified block diagram is shown illustrating an example computing system 100 including a transaction analysis system 105, virtual service system 110, testing system 130, among other hardware and software computing systems. In some implementations, functionality of the transaction analysis system 105, virtual service system 110, testing system 130, can be combined or even further divided and implemented among multiple different systems. Transaction analysis system 105 can include logic and functionality, implemented in software and/or hardware, for monitoring software transactions involving multiple different software components interacting within the transaction. The transaction analysis system 105 can sort transaction data generated from this monitoring and assess the transaction data to determine transaction fragments for each transaction. Each transaction fragment can include an interaction between two different software components within the transaction. The software components can be components of the same or different application, can be hosted on the same machine, in different machines within a local network, or different remote machines on a wide area network. Each transaction can include multiple transaction fragments. The transaction analysis system 105 can determine, from the transaction data, the ordering of the composite fragments of each transaction as well as the flow of each transaction (e.g., how the transaction proceeds from component to component until completion, as well as the potential alternative paths of the transaction (e.g., according to various decision points within the transaction). A graphical representation of the transaction, its flow, and the components involved in the transaction can be generated. Further, in this particular example, transaction analysis system 105 can also include logic for generating architecture documentation for one or more portions of the underlying system(s) performing the transaction, among other example functionality.

In some instances, transaction data and transaction flow data generated by transaction analysis system 105 can be used in other systems. For instance, some software systems (e.g., 115) can utilize, consume data and services of, provide data or services to, or otherwise be at least partially dependent on or function in association with one or more other computing systems, including third party computing systems (e.g., 120), or data stores, such as database 125, among other examples. Further, virtual models can be generated from captured transaction data that simulate the actions of other systems and software components with which a system under test (e.g., 115) interacts. For instance, a test can be developed for execution by testing system 130 that can make use of virtualized instances (or models) of a third party system (e.g., 120), database (e.g., 125), or other systems and system components, including local system components. These virtualized instances can stand-in for and simulate actions and communication of the corresponding real world components and can interact with the system under test, among other examples.

One or more computing systems and services can be hosted on machines communicatively coupled by one or more networks (e.g., 140), including local networks, public networks, wide area networks, broadband cellular networks, the Internet, and the like. Systems with which a system (e.g., 115) under test, development, used in training, etc. can interact can include other data stores (e.g., 125), systems (e.g., 120), and constituent software components accessible over the one or more networks 140. Further, systems and services (e.g., 105, 110, 130, etc.) provided to assess, test, and simulate one or more of systems 115, 120, 125, etc. can also be provided local to or remote from (e.g., over network 140) the target systems, among other examples. Additionally, computing environment 100 can include one or more user devices (e.g., 145, 150) that can allow users to interact with one or more of the servers, services, data structures, and services (e.g., 105, 110, 115, 120, 125, 130, etc.) provided, for instance, remotely over network 140, or at least partially local to the user devices (e.g., 145, 150), among other examples.

In general, "servers," "clients," "computing devices," "network elements," "hosts," "system-type system entities," "user devices," and "systems" (e.g., 105, 120, 125, 130, 145, 150, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 120, 125, 130, 145, 150, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a transaction analysis system 105, virtual service system 110, system under test (e.g., 115) or other sub-system of computing environment 100 can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, sub-system, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Software development teams may be required to produce written documentation describing the functional details and architecture of the software system they are developing. This documentation can describe the nature and characteristics of not only the software product the developers are producing, but also those components of other systems (planned, in-development, or existing) with which the software product is to interact. Engineer teams typically rely heavily on such documentation. Keeping such documentation accurate and up-to-date can be critical to ensuring that all parties understand how the application is put together, how it functions, how certain modules are intended to be used, and maybe even some known limitations. Further, documentation can include information and diagrams that can be later adopted in customer product literature. Typically, composing such written documentation is a manual and time-intensive process, involving the analysis of the underlying source code and the drafting of manual diagrams to illustrate the various components and interactions of the components in the system. Further, as the system evolves and is revised, this documentation may also need to be revised and re-drafted to reflect the underlying changes to the software product. As with other manual processes, manual drafting of software architecture documentation can be time consuming, resource intensive, and error-prone, as the drafters of the documentation may not, in some cases, be the same persons responsible for developing the product, among other human limitations.

Further complicating the drafting and revisioning of software architecture documentation, is the trend, in software development, toward agile developing principles. Software developed using agile development methods can tend to involve multiple, quick iterations (or revisions) to the software due to the short feedback loops and adaptation cycles emphasized in agile development. Where, traditionally, more predictive software development paradigms focused on an end goal or product with (ideally) minimal and infrequent revisions, the adaptive nature of agile software development results in substantially more frequent revisions. Consequently, it can be incredibly difficult for agile software development teams to ensure that written documentation for their software products is kept up to date, among other example challenges.

Figure 2:
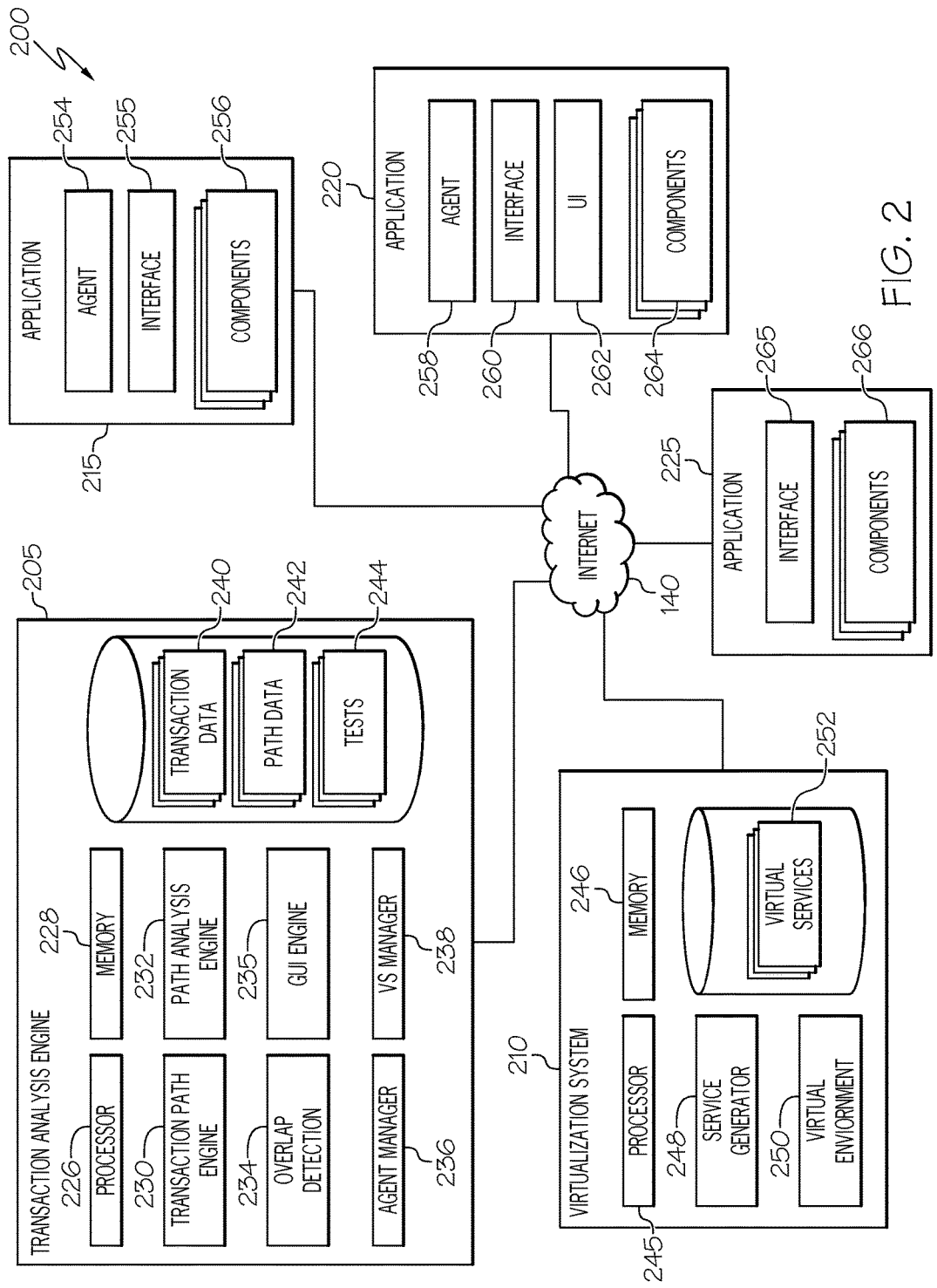
FIG. 2 is a simplified block diagram of an example computing system including an example transaction analysis system in accordance with at least one embodiment.

At least some of the systems described in the present disclosure, such as the systems of FIGS. 1 and 2, can include functionality that, in some cases, at least partially remedy or otherwise address at least some of the above-discussed deficiencies and issues, as well as others not explicitly described herein. For instance, tools can be provided that leverage the transaction flow data generated by a transaction analysis system 105 to automatically generate, from a portion of or combinations of transaction flow data, written documentation describing the architecture of the system performing the transaction(s). Further, other information collected during the monitoring of the system (e.g., in the transaction data), including information describing the internal operation and attributes of the individual components can be collected during monitoring of the transactions and this information can also be included in the written documentation generated for the underlying system. Such written documentation can further include graphical representations of the architecture, among other information.

Turning to the example of FIG. 2, a simplified block diagram 200 is shown illustrating an example environment 200 including a transaction analysis engine 205, a virtualization system 210, and one or more services, database management systems, programs, or applications (referred to in this example collectively as "applications"). The systems 205, 210, 215, 220, 225, etc. can interact, for instance, over one or more networks 140. In one example implementation, a transaction analysis engine 205 can include one or more processor devices (e.g., 226) and one or more memory elements (e.g., 228) for use in executing one or more components, tools, or modules, or engines, such as a transaction path engine 230, path analysis engine 232, documentation generator 234, graphical user interface (GUI) engine 235, agent manager 236, virtual service manager 238, among other potential tools and components including combinations or further compartmentalization of the foregoing. In some implementations, transaction analysis engine 205 can be implemented as multiple different systems including, for example, varying combinations of the foregoing components and tools (e.g., 230, 232, 234, 235, 236, 238, etc.) and accompanying data (e.g., 240, 242, 244).

In one example, transaction analysis engine 205 can include a transaction path engine 230 configured to inspect a particular application (e.g., 215, 20, 225) or combination of co-functioning applications (e.g., 215 and 220) to identify one or more transactions involving the application(s) as well as the respective software components (e.g., 256, 264, 266) of the applications (e.g., 215, 220, 225) invoked and utilized within the transaction. Information gathered from monitoring or inspection of the transaction can be stored in transaction data 240. Further, the flow path of the transactions can additionally be identified and flow path data 242 can be generated (e.g., using transaction path engine 230) describing the flow between software components (e.g., 256, 264, 266) and the respective contributions, operations, processes, or transaction fragments of the applications within the flow.

In some implementations, transaction path engine 230 can operate cooperatively with an agent manager 236 interfacing with or otherwise managing one or more instrumentation agents (or "agents") (e.g., 254, 258) deployed on one or more applications (e.g., 215, 220) for use in aiding the monitoring of performance of various components (e.g., 256, 264) of the applications. Agents (e.g., 254, 258) can be software-implemented agents that are configured to provide visibility into the operations of one or more software component (e.g., 256, 264, etc.). Each agent can be configured, for example, to detect requests and responses being sent to and from the component or application in which that agent is embedded. Each agent (e.g., 254, 258) can be further configured to generate information about the detected requests and/or responses and to report that information to other services and tools, such as agent manager 236, virtualization system 210, transaction path engine 230, test execution engine 235, etc. Such information can be embodied as agent data. Additionally, each agent can be configured to detect and report on activity that occurs internal to the components in which the instrumentation agent is embedded or which the agent otherwise is capable monitoring. Agents can be implemented in a variety of ways, including instrumenting each component with a corresponding agent, instrumenting an application or other collection of the software components with a single, shared agent, among other examples.

In response to detecting a request, response, and/or other activity to be monitored, each agent (e.g., 254, 258) can be configured to detect one or more characteristics associated with that activity and/or the monitoring of that activity by the agent. The characteristics can include a frame identifier, which identifies a message, with respect to the agent, sent by the instrumentation agent to a managing service, such as agent manager 236 to report the characteristics observed by the agent. For instance, frames can include a parent identifier, which identifies the requester that generated the request sent to the component or sub-component monitored by the instrumentation agent; a transaction identifier, identifying the transaction, with respect to the component or sub-component being monitored, such as transactions between components carried out through communications and calls made over one or more network connections; and an agent identifier that identifies the agent, with respect to the other instrumentation agents in the testing system, that is generating the characteristics, among other characteristics. Such characteristics can include other information such as a system clock value, current processor and/or memory usage, contents of the request, contents of the response to the request, identity of the requester that generated the request, identity of the responder generating the response to the request, Java virtual machine (JVM) statistics, standard query language (SQL) queries (SQLs), number of database rows returned in a response, logging information (e.g., messages logged in response to a request and/or response), error messages, simple object access protocol (SOAP) requests, values generated by the component that includes the instrumentation agent but that are not returned in the response to the request, web service invocations, method invocations (such as Enterprise Java Beans (EJB) method invocations), entity lifecycle events (such as EJB entity lifecycle events), heap sizing, identification of network connections involved in transactions, identification of messages and data exchanged between components, including the amount of such data, and the like. Characteristics can also include the thread name of a thread processing the request to generate the response and other data describing threads involved in a transaction, the class name of the class of an object invoked to process the request to generate the response, a Web Service signature used to contain the request and/or response, arguments provided as part of the request and/or response, a session identifier, an ordinal (e.g., relating to an order within a transaction), the duration of time spent processing the request and/or generating the response, state information, a local Internet Protocol (IP) address, a local port, a remote IP address, a remote port, and the like, among other examples.

As the above examples indicate, characteristic information can include information generated by the agent itself and information generated and/or processed by the component or sub-component monitored (and collected) by the agent (such as data sent or received by the component that intercepted by one or more agents). The agent can then cause information identifying those characteristics to be provided to one or more other services or tools (e.g., 230, 236 etc.) communicatively coupled to the agent. In some embodiments, each instrumentation agent collects information to form a message, also referred to herein as a frame, which describes characteristics associated with both a detected request and a detected response corresponding to that request. In such embodiments, the respective agent can wait for the response corresponding to the request to be generated and sent before sending the frame to another tool or engine (e.g., 230, 232, 234, 235, 236, 248, etc.) making use of the information in the frame. Additionally, agents can monitor and report characteristics independently for each transaction in which its respective monitored component(s) (e.g., 256, 264, etc.) participates. In addition to monitoring the performance of a component and aggregating information about that component over one or a multitude of transactions (such that information about the performance of individual transactions can, for example, be averaged or statistically assessed based upon the observed performance of the component over the course of multiple monitored transactions), agents (e.g., 254, 258) can additionally provide characteristics that are specific to and correlated with a specific transaction. More particularly, these characteristics that are monitored and reported by the agents can be specific to and correlated with a particular request and/or response generated as a part, or fragment, of a transaction.

In some embodiments, all or some of agents (e.g., 254, 258) can be configured to perform interception and/or inspection (e.g., using the Java™ Virtual Machine Tool Interface, or JVM TI). Such an instrumentation agent can register with the appropriate application programming agent (API) associated with the component or process being monitored in order to be notified when entry and/or exit points occur. This allows the agent to detect requests and responses, as well as the characteristics of those requests and responses. In particular, this functionality can allow an agent to detect when a component begins reading and/or writing from and/or to a socket, to track how much data is accessed (e.g., read or written), obtain a copy of the data so read or written, and generate timing information (as well as information describing any other desired characteristics such as inbound/read or outbound/write identifiers) describing the time or order at which the data was read or written, among other information describing the data accessed, processed, or generated by the component.

In some instances, agents (e.g., 254, 258) can be configured to monitor individual threads by monitoring the storage used by each thread (i.e., the thread local storage for that thread), among other information. Such agents can detect when the monitored thread begins reading or writing to a thread local variable in the thread local storage. In response to detecting this access to the thread local variable, the agent can track the amount (e.g., in bytes, as tracked by incrementing a counter) of data that has been accessed, as well as the starting offset within the thread local storage to which the access takes place. In response to detecting that the thread's access to the thread local variable has ended, the instrumentation agent can use the information about the access to identify characteristics such as the time of the access, the variable being accessed, the value being accessed, network calls being made, and the like.

As noted above, in some implementations, one of the characteristics that can be collected by agents (e.g., 254, 258) can include timing information, such as a timestamp, that indicates when a particular request was received or when a particular response was generated. Such timing information can be included in transaction data 240 and be used, for instance, by transaction path engine 230, to identify that frames, including frames received from different agents, are related to the same transaction. In some implementations, timers used by agents (e.g., 254, 258) can be synchronized to assist in correlating timing information collected between multiple agents. Additionally or alternatively, flow, organization, hierarchy, or timing of a particular transaction can be identified through the generation of transaction identifiers that include characteristics collected by agents (e.g., 254, 258) for use in identifying fragments of the transaction. Such transaction identifiers, or transaction fragment identifiers, can include data collected by instrumentation agents in connection with, for example, the exchange of data, messaging, and other communications between components in the transaction, from thread jumps identified within software processes involved in the transaction, and other features of the transaction or fragments of the transaction.

In some implementations, agents (e.g., 254, 258) can be implemented by inserting a few lines of code into the software component (or the application server associated with that software component) being instrumented. Such code can be inserted into a servlet filter, SOAP filter, a web service handler, an EJB3 method call, a call to a Java Database Connectivity (JDBC) handler, and the like. For example, an agent configured to monitor an EJB can be configured as an EJB3 entity listener (e.g., to monitor entity beans) or interceptor (e.g., to monitor session beans). Some components (or their corresponding application servers) may not provide users with the ability to modify their code, and thus some instrumentation agents can be implemented externally to the component being monitored in a manner that can cause all requests and responses being sent to and/or from that component to be handled by the corresponding agent(s). For example, for an existing database, an agent can be implemented as a driver. Calling components can be configured (e.g., by manipulating a driver manager) to call the instrumentation driver instead of the database's driver. The instrumentation driver can in turn call the database's driver and cause the database's driver to return responses to the instrumentation driver. For example, in one embodiment, the identity of the "real" driver for the database can be embedded in the uniform resource locator (URL) that is passed to the instrumentation driver. In this way, the instrumentation driver can intercept all calls to the database, detect characteristics of those calls, pass the calls to the appropriate database, detect characteristics of the corresponding responses, and then return the characteristics of those calls and responses within corresponding transaction data 240, among other examples.

As requests and responses progress through one or more systems (e.g., 215, 220, 225), additional characteristic information can be captured, for instance, as transaction data 240. For example, a test, simulation, or live operation of one or more software systems (e.g., 215, 220, 225) engaged in one or more transactions can be monitored, for instance, by one or more agents (e.g., 254, 258) and the agents can capture characteristic information associated with requests in the transaction (e.g., the time at which the request was received, the sender of that request, the time at which corresponding requests were sent to a database and/or other service, etc., how much data was exchanged, the identity of the communication channel used in the request or response, and the like) and the corresponding response, and generate transaction data 240 embodying the information. Agents, in some instances, can store at least a portion of the transaction data at the agent and can also, or alternatively, send transaction data 240 to other services and tools. In some instances, transaction data can be generated from or comprise agent data, among other examples.

In one implementation, a transaction path engine 230 can access and utilize transaction information in transaction data 240 to identify fragments of a transaction and organize transaction fragments and accompanying information describing characteristics of the fragment of a particular transaction into groups corresponding to a common transaction. For instance, transaction fragment characteristics can be correlated to group corresponding frames into groups of frames that describe a complete transaction. In some embodiments, in order to group frames, or otherwise identify relationships between frames or transaction fragments, transaction path engine 230 (or another tool) can sort the frames based upon particular characteristics, such as timing information associated with and/or included within those frames. After being sorted, the frames can be arranged in ascending or descending order, with respect to the timing information. For example, the frames can be sorted according to a timestamp indicating when each frame was generated, when one or more requests identified in each frame were generated or received, and/or when one or more responses identified in each frame were generated or received. In some embodiments, the frames can be sorted based upon multiple pieces of timing information. In other examples, frames can be sorted, for example, based on an amount of data exchanged, the identity of a particular communication channel or network connection used, addresses of the receiving and sending components, the identification of the particular agents that provided the frames, etc.

In an additional example, frames and accompanying transaction fragments can be correlated according to the amount and type of data that was received and/or generated, as detected by the agent, as well as information identifying the components or sub-components involved in the monitored activity. For example, such identity information can include information identifying the network ports (e.g., of the requester and responder), IP addresses, network information, or other features describing the communication of a request and corresponding response between a requester and responder. This information can be used to correlate or otherwise identify relationships between two different frames that have similar timing information and data amounts, for example. Identified network connections can be mapped to a particular portion, or fragment, of a transaction, and such fragments can be grouped (e.g., using the collected network connection description data) to identify particular transactions involving multiple different software components (and network connections), among other examples.

Within a group of frames or identified transaction fragments associated with the same transaction, transaction path engine 230 can order, or stitch, the frames to define a chain or order of transaction fragments within a given transaction or set of instances of a similar transaction. The stitching of the frames can be based on determined correlations between grouped frames (e.g., to identify parent-child relationships between given frames and their corresponding transaction fragments). The stitched frames can then define a transaction flow to allow the path, or flow, of the transaction to be followed from the start of the transaction to the end of the transaction and across a chain of potentially many different software components. Each frame can include a field that identifies that frame (e.g., a frame ID), as well as a field that identifies a parent frame (e.g., a parent frame ID). The value of each frame's parent frame ID can equal another frame's frame ID. These frame identifiers can be generated by the agents. In one embodiment, the frame identifiers can be generated from information identifying the IP address (or other addressing information) and port number used by the monitored component or sub-component, the amount of data sent or received by the monitored component during the monitored activity, and/or the instrumentation agent itself, among other information. Relationships can thereby be identified between parent frames, transaction fragments, and software components and corresponding child frames, transaction fragments, and components, to stitch these frames together, among other examples.

In addition to being able to use relationships or correlations to predict or determine a stitching or flowpath of transaction fragments, transaction path engine 230, in some instances can use the lack of correlative data reported by an agent to determine that a given frame corresponds to a transaction fragment that represents a root or leaf (e.g., beginning or end) of a particular transaction or branch of a transaction. For instance, it can be identified that no related connections (or other transaction fragments) involving a particular software component (or just a single correlation) have been identified or reported and conclude, predictively, that the lack of further connections or other reporting data relating to the component or a flow including the component indicate that the transaction terminated at the component, among other examples. Similarly, root nodes can be predictively determined based on the absence of frames documenting an inbound connection at a particular component from which other transaction fragments (and related connections) originate, among other examples.

A transaction path engine 230 can utilize and correlate transaction data 240 (or agent data upon which transaction data is based) generated in part by one or more agents (e.g., 254, 258) to determine one or more transaction flow paths. The transaction path engine 230 can generate and maintain path data 242 describing the determined flow paths involving one or more software components (e.g., 256, 264, 266) or one or more software systems or applications (e.g., 215, 220, 225). Path data 242 can be used in a variety of applications, including testing, verification, and documentation. For instance, test cases to be used to govern and verify results of a test of a piece of software can be developed, in part, from path data corresponding to the piece of software to be tested, among other uses. Further, a path analysis engine 232 can consume path data 242 to perform additional activities and services in support of tests of software systems (e.g., 215, 220, 225), such as identifying boundaries between systems (e.g., 215, 220, 225), components (e.g., 256, 264, 266), and corresponding agents (e.g., 254, 258). Additionally, path analysis engine 232 can identify particular data (e.g., as captured in transaction data or other agent data) that is generated within transactions modeled by the path data 242 and further identify sources of the particular data as well as the path of the particular data as it traverses and is processed by other software components within a transaction before being output as a response or result of the transaction, among other examples. Path analysis engine 232 can further, in some instances, process transaction path data or other data to identify boundaries between system components and systems within a system, as well as boundaries of portions of systems monitored by a respective agent, among other examples.

Figure 6:
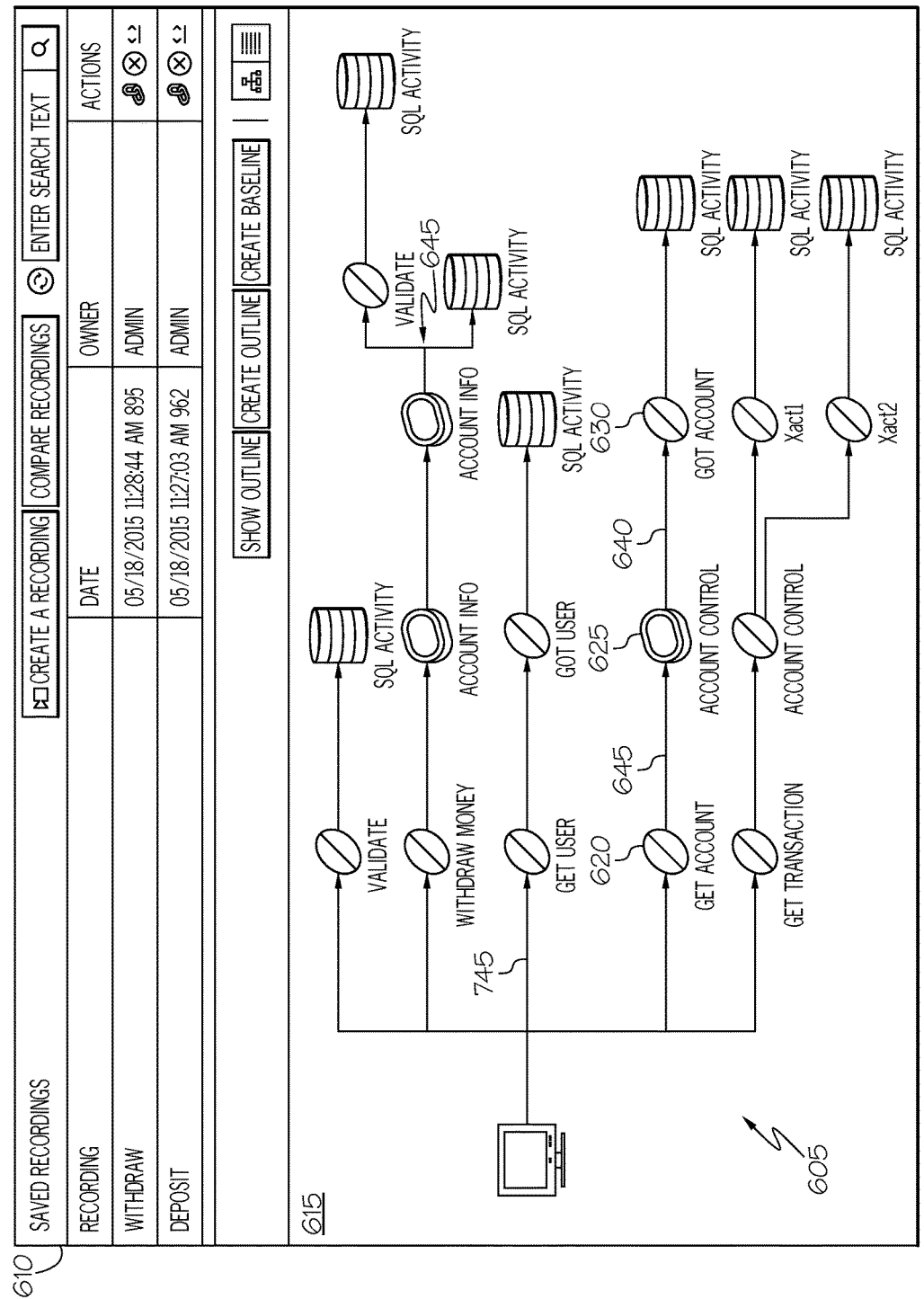
FIG. 6 is a screenshot of an example graphical user interface provided in connection with a transaction analysis system in accordance with at least one embodiment.

A GUI engine 235 can access path data (and transaction data 240) and render the data to generate graphical representations (in one or more GUIs of the transaction analysis engine) of the transaction information embodied in the path and transaction data. For instance, the GUI engine 235 can be used to generate a graphical representation of the flow of a transaction. The flow can represent a single instance of an observed transaction or the aggregate of multiple observed instances of the same (or multiple different) transactions. FIG. 6 illustrates one example of a GUI 600 that can be generated using GUI engine. In the example of FIG. 6, a graphical representation 605 of a transaction "withdraw" is selected (e.g., in GUI window 610) and presented within the GUI window 615. The graphical representation 605 can include graphical blocks (e.g., 620, 625, 630, etc.) representing individual software components identified as participating in the transaction. Further, graphical lines (e.g., 635, 640, etc.) can connect two of the software component representations (e.g., 620, 625, 630, etc.), with each graphical lines (e.g., 635, 640, etc.) representing an observed transaction fragment involving a request and response between the two connected software components.

GUI representations of transaction flows generated by GUI engine 235 can be interactive. A variety of information can be collected (e.g., from agents) during monitoring of transactions, including characteristics of each transaction fragment and characteristics of the software components as they are engaged in the transaction. Each of the graphical elements e.g., 620, 625, 630, 635, 640, etc.) included in the representation 605 can be interactive, allowing users to select one or more of the elements to inspect more detailed information concerning the selected software component(s) and/or transaction fragment(s). For instance, selection of a given transaction fragment element (e.g., 635) can cause the GUI to present details concerning the selected transaction fragment including the request(s) and response(s) of the fragment, values and characteristics of the request/response, the response time, the amount of data transmitted in the request and response, the type of data sent in the request and response, the type of transport mechanism used to communicate the request and response, exceptions, logged events, and other data generated in connection with the fragment, among other example characteristics. Further, selection of a given graphical representation of a software component (e.g., 620, 625, 630) can cause the GUI to display information concerning the software component including its name, type, host system, port and socket information, session ID, local and remote IP, thread information, parent ID, exception dumps, supported communication protocols, the amount of memory or processing capacity used by the software component in transaction fragments participated in by the software component, among other example characteristics.

Returning to the example of FIG. 2, transaction analysis engine 205 can include a documentation generator 234 that can automatically generate software architecture documentation corresponding to software components described in transaction and path data 240, 242. For instance, a graphical representation of the software system can be generated similar to that shown and described in the example of FIG. 6, which shows a tree-like architecture showing how the various components of a software system interact with each other in an architecture. Documentation templates can be defined and transaction and path data 240, 242 can be searched and sorted to identify a portion of the data that corresponds to a given system for which documentation is to be generated. The corresponding transaction and path data 240, 242 can be used to populate fields of the defined documentation template and can be further used to generate a corresponding graphical representation of the software system (which can populate sections of the documentation template where an architectural rendering is to be provided). The documentation generator 234 can filter transaction data already generated and stored, as well as new transaction data, to pinpoint that portion of the transaction data that corresponds to generation of documentation for a particular software system. In some instances, a user can request that documentation be generated for a particular software system, which triggers documentation generator 234 to cause one or more transactions to be performed using the particular software system. The transactions are monitored (e.g., by agents), causing up-to-date transaction data 240 and path data 242 to be generated. In cases where this document generation-specific transaction is launched and monitored while other transactions are being monitored (including transactions involving the same software system), the documentation generator can filter results so that only that transaction data and flow data of transactions launched for the documentation generator are considered and used to generate corresponding documentation. In this way, documentation can be generated automatically to reflect the real-time characteristics of the software system, thereby catching any potential modifications made to underlying components since the last time documentation was generated for the software system.

In still other examples, a virtualization system 210 can be provided that interoperates with transaction analysis engine 205. A virtualization system 210 can includes one or more processor devices 245, memory devices 246, and other hardware and software components including, for instance, a virtual service generator 248, virtual environment 250 for provisioning and executing virtual services, among other examples. A virtualization system 210 can be used to generate and manage virtual services (e.g., 252) that model software components and systems. Such virtual services 252 can be used as stand-ins in tests involving the real-world systems modeled by the virtual service. Virtual services 252 can be generated by virtualization system 210 (e.g., using virtual service generator 248) based on detected requests and responses exchanged between two or more software components or systems. Such request and response information can be captured, for instance, by agents (e.g., 254, 258) capable of monitoring a software component that is to be virtualized or that interacts with another software component to be virtualized, among other examples. Virtual services can capture and simulate the behavior, data and performance characteristics of complete composite application environments, making them available for development and testing at the request of a user or system and throughout the software lifecycle, among other advantages.

A virtualization system 210 can include functionality for the creation of complete software-based environments that simulate observed behaviors, stateful transactions and performance scenarios implemented by one or more software components or applications. Such virtual services provide functionality beyond traditional piecemeal responders or stubs, through logic permitting the recognition of input/ requests and generation of outputs/responses that are stateful, aware of time, date, and latency characteristics, support such transaction features as sessions, SSL, authentication, and support string-based and dynamic request/response pairs, among other features. Service virtualization and other virtual models can be leveraged, for instance, when live systems are not available due to project scheduling or access concerns. In cases where components have not been built yet, environments can employ virtual services to rapidly model and simulate at least some of the software components to be tested within an environment. Virtual services can be invoked and executed in a virtual environment 250 implemented, for instance, within on-premise computing environments, in private and public cloud-based lab, using virtual machines, traditional operating systems, and other environments, among other examples. In some implementations, virtualization system 210 and virtual services 252 can utilize or adopt principled described, for example, in U.S. patent application Ser. No. 13/341,650 entitled "Service Modeling and Virtualization," incorporated herein by reference in its entirety as if completely and fully set forth herein.

In implementations utilizing one or more agent managers (e.g., 236), multiple agents (e.g., 254, 258) can communicate with single agent manager 236 via a messaging system. In some cases, agents monitoring components hosted on distinct, or remote, devices can communicate over one or more networks with one or more centralized, or semi-centralized, agent managers 236. In one example implementation, agents (e.g., 254, 258) can communicate with an agent manager 236 using a messaging system such as Java™ Message Service (JMS), among other examples. For instance, agent manager 236 can create a messaging system topic for each transaction (referred to herein as a transaction frame (TF) topic) and subscribe to that TF topic. The instrumentation agents, upon startup, can broadcast their existence to each other and/or to agent manager 236. The agents (e.g., 254, 258) can then get the TF topic from agent manager 236 and begin publishing messages onto a message bus on that TF topic. Agent manager 236 can monitor the published messages and determine whether those messages relate to the current TF topic. As needed, agent manager 236 creates new TF topics for new transactions. In other examples, agents (e.g., 254, 258) can alternatively communicate with agent manager 236 using techniques other than those involving messaging systems. For example, agents can write information to shared data repository (e.g., a database associated with the test system) using database commands, and an agent manager 236 can monitor those database commands to detect new information, among other examples.

Figure 3:
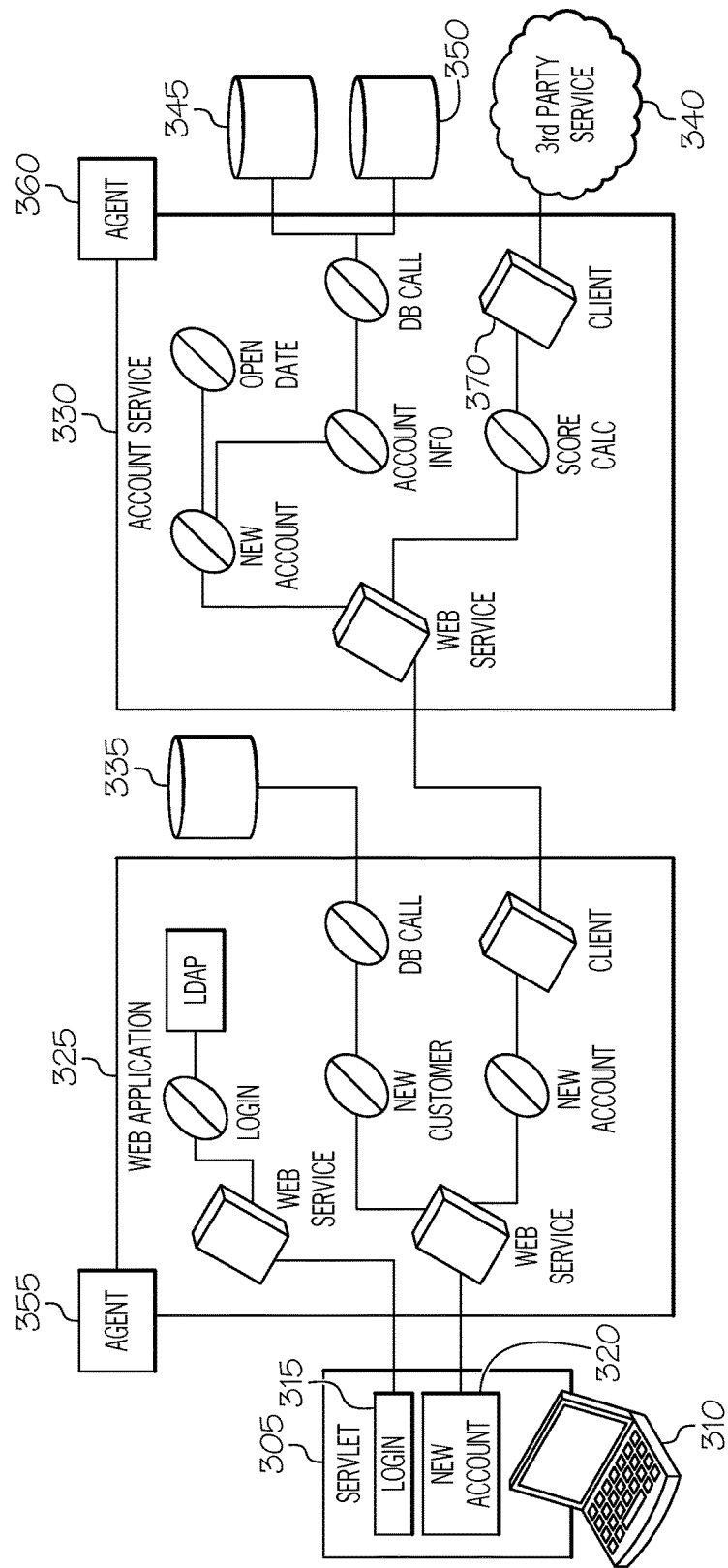
FIG. 3 is a simplified block diagram of an example system to perform one or more transactions in accordance with at least one embodiment.

Turning to FIG. 3, a simplified block diagram is shown representing example software systems and components capable of engaging in one or more transactions that can be monitored and modeled using the example systems and techniques disclosed herein. It should be appreciated that the example systems and transactions shown here are presented for illustrating certain general features and principles and are provided as non-limiting, simplified examples. Indeed, the features and principles discussed herein have application to a potentially limitless array of real-world systems and transactions (e.g., different from those illustrated in FIGS. 3-5C) that can likewise be monitored, analyzed, and tested in accordance with the principled outlined herein.

Figure 4A:
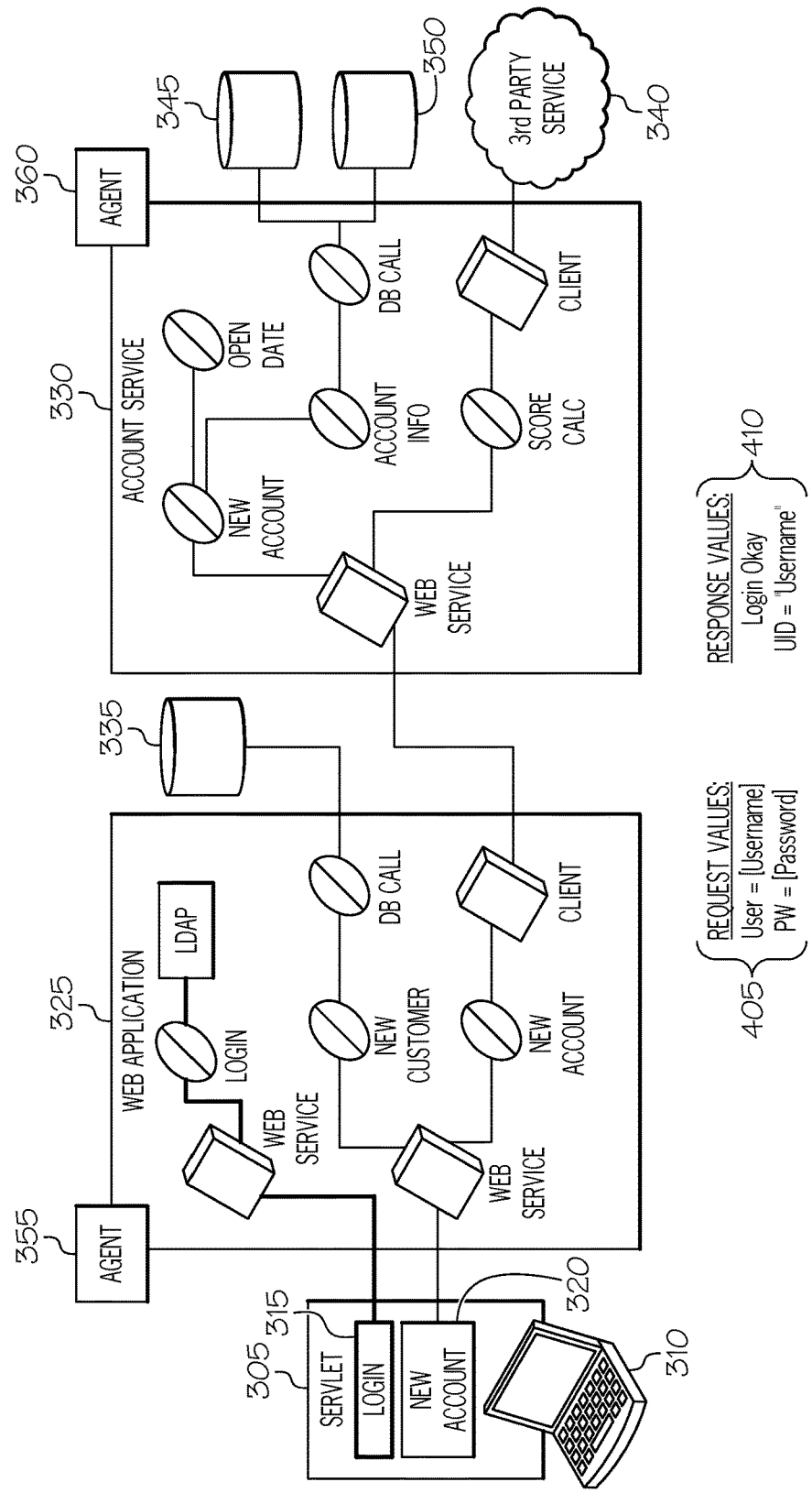
FIGS. 4A-4F are simplified block diagrams illustrating example transaction flow paths involving the example system of FIG. 3 in accordance with at least one embodiment.

In the particular example of FIG. 3, a servlet component 305 is provided as a front end for an example Login transaction 315 and New Account transaction 320 accessible to users of user computer devices (e.g., 310). The Login transaction can involve calling a web service of a web application 325 and use of a Login software component (e.g., implemented in this particular example as JavaBean software components) and Lightweight Directory Access Protocol (LDAP) system to facilitate the logging-in of a user into an account of the web application 325. FIG. 4A illustrates the flow path of the example Login transaction 315 as well as example request values 405 of the Login transaction together with example response values 410 returned in the transaction in response to the request values 405. For instance, Login transaction can include a user-provided username and password pair (provided through servlet 305) resulting in a Login Okay response value when the provided username-password pair matches the username-password pair of an existing account managed by the LDAP system of web application 325. Further, the identity of the username can also be returned, for instance, in a welcome message identifying the username.

Figure 4B:
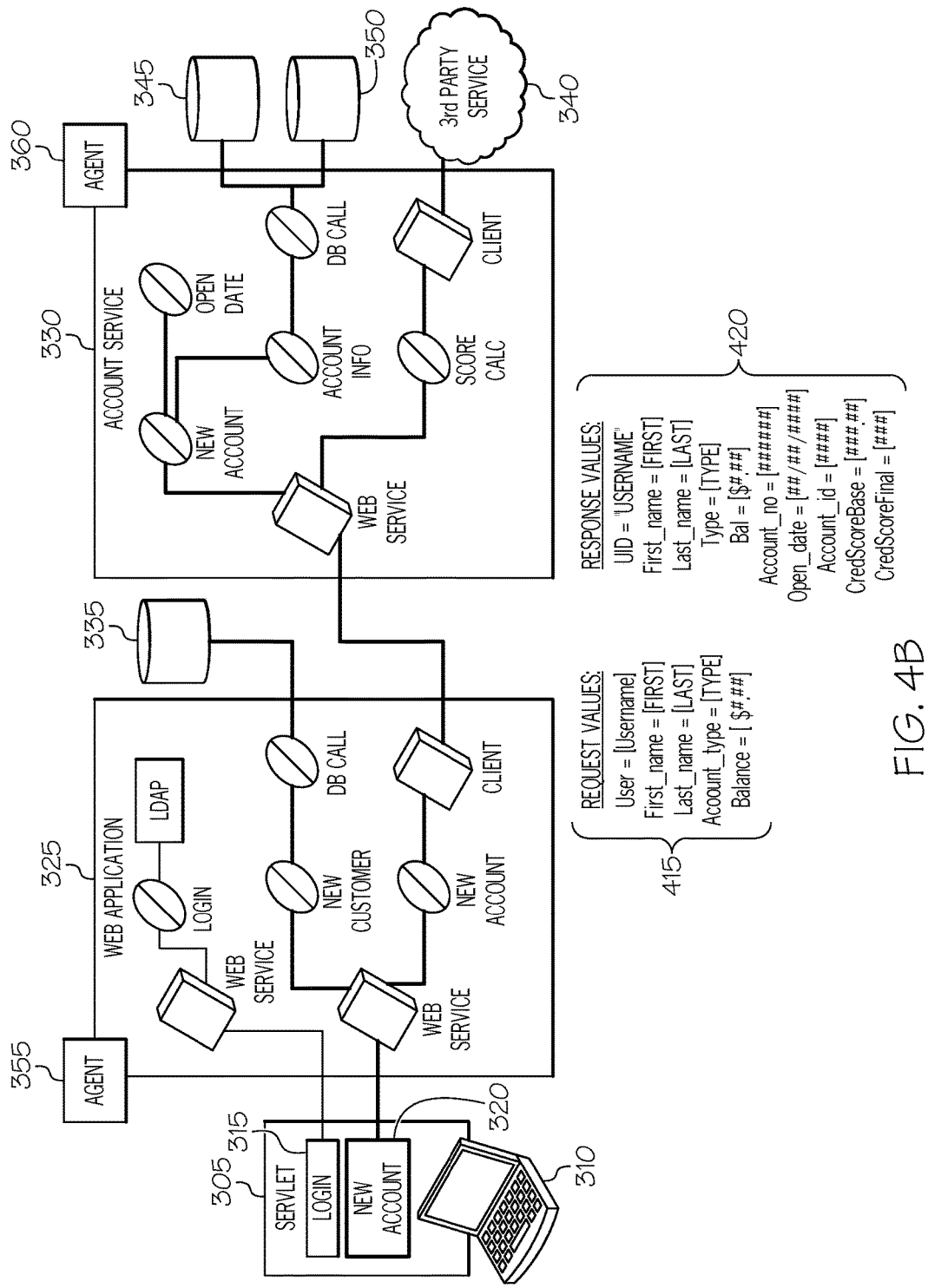

Returning to FIG. 3, additional transactions can be provided and identified. For instance, the New Account transaction 325 can support the creation and storage of a new account, such as an account for an ecommerce, banking, media subscription, or other application or service. For instance, as shown in the example of FIG. 4B, a more complex flow path can be identified for the New Account transaction 325 including multiple branches in the flow path. For example, upon creation of a new account (using New Account transaction 325) corresponding account information can be entered into a database 335 maintained outside of web application 325 and account service 330. The account information can be generated by one or more software components, such as by software components of account service 330, database 345, third party service 340, or other services and entities. New Account transaction can accept inputs or request values 415, such as username, first name, last name, account type, and account balance (e.g., for a loan, bank, e-payment, or other financial account). These request values 415, when processed in the transaction, can cause the retrieval, generation, and return of response values 420 including response values (such as values corresponding to user ID, first name, last name, account type, and balance) that are at least partially dependent or predictable based on values of the request values 415, as well as additional response values (such as values of an account number, account open date, account ID, credit score, etc.) that are not derived from or based on any of the request values 415.

The flow paths of each respective transaction involving a particular software component or system can be represented in transaction path data generated, for instance, using a transaction path engine. Transaction path data can be generated by grouping and correlating transaction fragment information included in transaction data and/or agent data captured and generated by one or more agents 355, 360 deployed on the software components and/or systems involved in the transactions, as illustrated in the example of FIG. 3. Some software components, such as third party service 340, may be unmanaged in that they are not instrumented with agents under the control of or otherwise accessible to a transaction path engine, test engine, or other tool or entity monitoring the transaction. The involvement and functionality of such unmanaged software components may remain unknown to the tools utilized in the development of transaction paths and tests of a particular transaction, and can be effectively regarded as a black box within the transaction that accepts certain monitored requests and returns corresponding responses captured, in some instances, by the agent (e.g., 360) of a neighboring monitored software component (e.g., SOAP client 370) receiving the response value from the unmonitored component (e.g., third party service 340), among other examples.

Figure 4C:
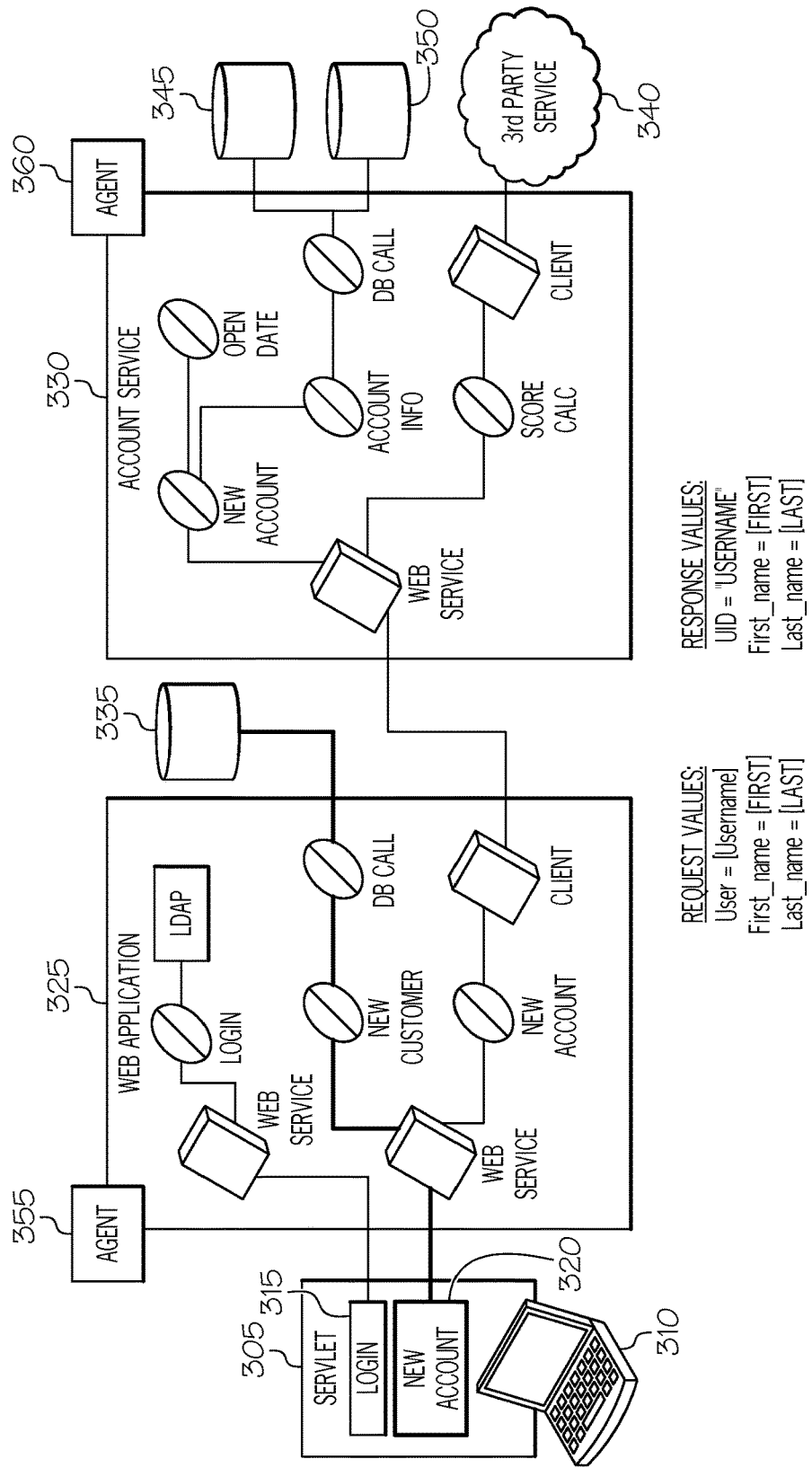

In some implementations, a single transaction can include the generation, communication, and use of multiple different response values. The generation and processing of various data within a transaction can involve the transmission of request values and response values to multiple different software components along multiple different sub-paths, or branches, of the transaction flow path. For example, FIG. 4C shows an example of a first branch of a transaction flow path shown bolded in FIG. 4B. The flow path branch of FIG. 4C shows a path for generating and storing a response value in database 335. For example, a response value can be generated or communicated by a New Customer software component for a new customer record utilizing other account information generated in the transaction. Response values such as UID, First_name, and Last_name may be provided from or generated by a New Customer software component or from a database call of database 335, among other examples. The actual values of UID, First_name, and Last_name, in some examples, can be obtained from request values provided by a user, such as the request values User, First_name, and Last_name. In some examples, proper operation of the New Customer software component may be evidenced by the generation of response values UID, First_name, and Last_name that echo request values User, First_name, and Last_name, among other examples.

Figure 4D:
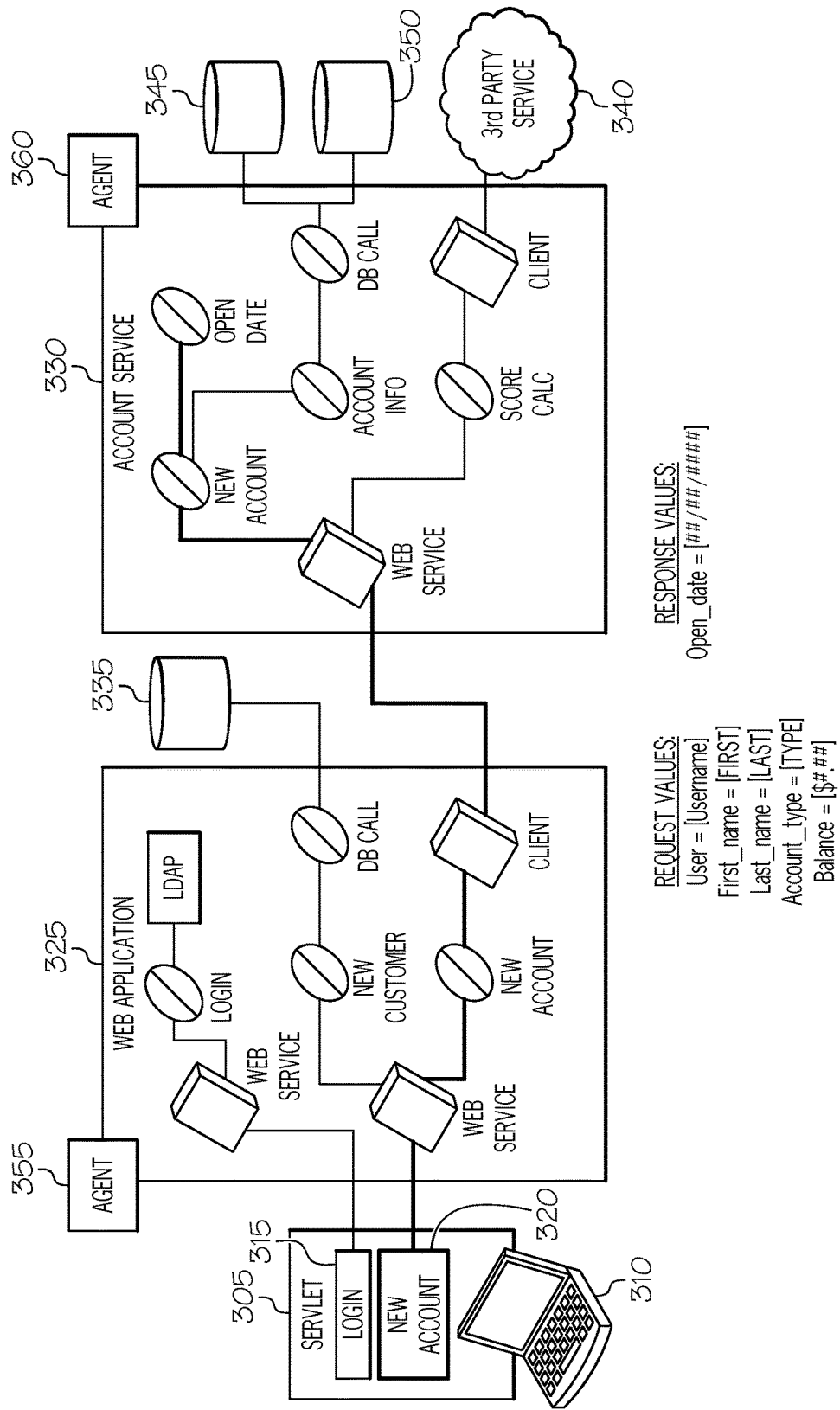

FIG. 4D illustrates another branch of an example New Account transaction, such as the New Account transaction introduced in the example of FIG. 4B. An account open date (e.g., Open_date) can be one of the response values returned in connection with the New Account transaction. In one example, an Open Date software component can include the logic for generating an account open date to be associated with a record to be provided to database 335 corresponding to the opening of the new account in connection with the New Account transaction. The account Open_date value can be generated by the Open Date component in response to a call from a New Account component of account service 330. The New Account component can additionally manage the generation of additional account data, such as by the Account Info component. The New Account component can be called through a web service call (such as a SOAP call) from web application 325 to account service 330 triggered by a New Account component at web application 325. Accordingly, as shown in the example of FIG. 4D, the invocation of an Open Date software component object can be triggered through a series of calls originating at servlet 305 and the response value Open_date can be generated and passed back from the Open Date component as a response over the same transaction flow path branch to be returned to servlet 305. The value of Open_date can be passed and reappear at each of the components upstream (i.e., in the direction of the flow path toward the software component originating the transaction request (e.g., servlet 305)). The Open Date software component can be identified as the source of the Open_date response value based on an identification of the Open Date component as a leaf in the transaction flow path branch corresponding to the Open_date response value. The Open Date software component can be identified as the leaf of the transaction flow path branch based on, for example, transaction data illustrating that the Open Date software component has no children components but is, instead, only a child component of other components with respect to the Open_date response value and the corresponding transaction path branch, among other examples.

Figure 4E:
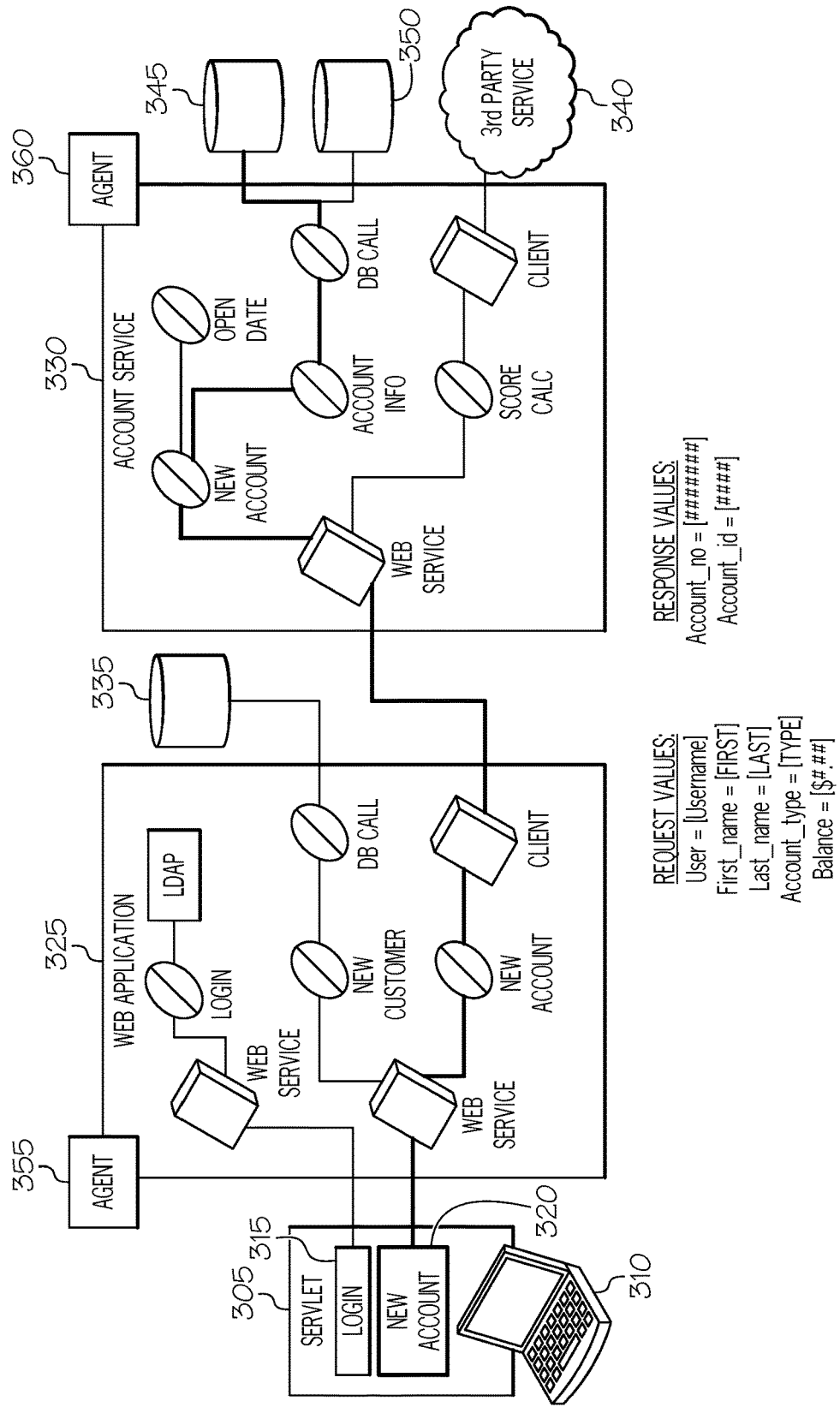

The example of FIG. 4E illustrates another example transaction flow path branch, in this case, relating to the chain of requests resulting in the generation of response values Account_no (e.g., providing the new account number generated for the account) and Account_id (e.g., corresponding to a database record for the new account), generated, for instance, by an unmonitored software component, such as database 345 or other data store, external to monitored software systems 325, 330, among other examples. The values of Account_no and Account_id, as with Open_date, may be independent of the request values provided in the transaction and involve calls by software components across application boundaries and networks connecting two disparate applications (e.g., 325, 330). For instance, the New Account software component of web application 325 may call the New Account software object of account service 330 using a web service call. An Account Info software component of account service 330 may in turn be called to generate values for the new account. For example, a database component 345 may include logic for auto-incrementing account number values (e.g., Account_no) for each new record that is added to the database 345. It can be identified that a database call was made to database 345 and that such a database call is a leaf of the transaction path branch. Further, it can be identified that the database 345 is the source of a particular value, such as in the example of FIG. 4E. Although the database 345 is not monitored by an agent, in some implementations, a transaction path engine or other tool can recognize certain types of calls to external components, such as SQL database calls, inverted list database calls, virtual storage access method (VSAM) calls, indexed sequential access method (ISAM) calls, flat file queries, and cache database calls, among other examples. Through such types of calls, the transaction path engine can make certain assumptions about the nature and operation of the external component. For instance, in the example of FIG. 4E, in instances of a SQL call to component 345, the SQL call can be identified, by an agent 350, and interpreted to conclude that component 345 is a database and the source of the value returned in response to the SQL call, among other examples. For instance, other types of calls can be used to implicitly identify the general character of a software component generating or returning a particular value in a transaction.

Figure 4F:
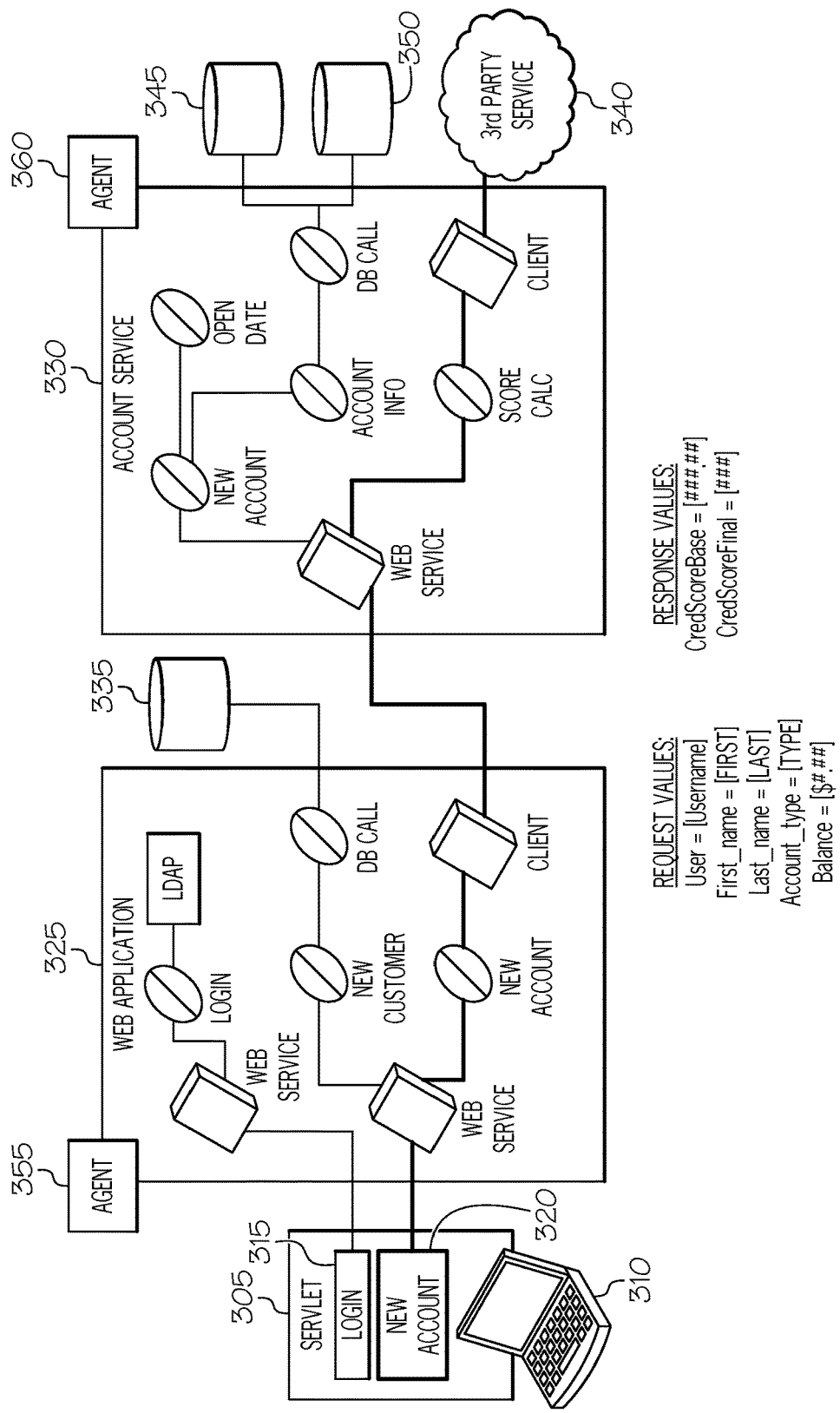

FIG. 4F illustrates another example transaction path branch involving a call to an unmonitored third party service 340. Transaction data collected or generated by agents 355, 360 can be processed to create transaction path data that can be analyzed to identify that a CredScoreBase value is returned from a third party service 340 and that the CredScoreBase value is utilized by a Score Calc software component to generate a CredScoreFinal value. Accordingly, an analysis of the corresponding transaction path data can result in the identification of the third party service 340 as the source of the CredScoreBase value and the Score Calc component of the account service 330 as the source of the CredScoreFinal value. As the third party service 340, in this example, is unmanaged, agents 355, 360 used to monitor the transaction are left without intelligence regarding how the CredScoreBase value is generated within the third party service 340, whether other external services are called in connection with the generation of the CredScoreBase value by the third party service 340, and so on. On the other hand, the agent 360 monitoring Score Calc component can identify with precision that the CredScoreFinal value was generated by the Score Calc component based on a CredScoreBase value returned from the unknown third party service 340. Further, agent 360 can capture the value returned by third party service 340 through monitoring of web service client 370, Score Calc component, etc.

Figure 5A:
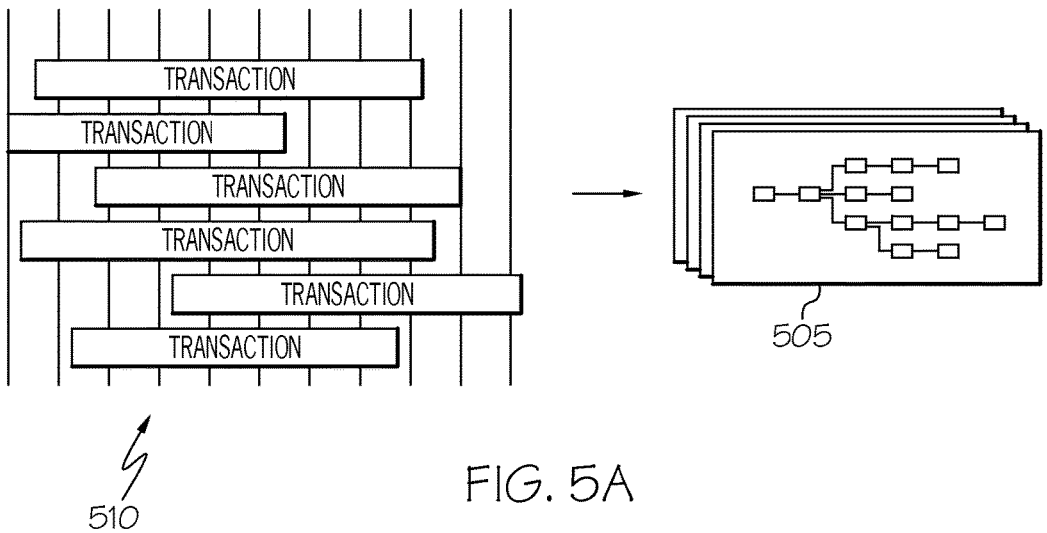
FIGS. 5A-5B are simplified block diagrams illustrating generation and use of transaction data in connection with monitoring of software transactions in accordance with at least one embodiment.

Turning to FIG. 5A, a simplified block diagram is shown illustrating the generation of transaction path data (e.g., 505) from multiple transactions 510 monitored by one or more agents of a transaction analysis system. As represented in FIG. 5A, a system can be engaged in multiple distinct transactions during a single period of time t. The transactions can be transactions occurring within live production operation of the system and/or test transactions (e.g., with a live or test deployment of the system). Further, some of the transactions can be instances of the same transaction type (e.g., different instances of the same login, withdraw, account creation transaction, etc.) or instances of different transaction types that nonetheless use the same software system (and even common software components within the software system). Monitoring of these concurrent transactions can also be take place concurrently and transaction data generated from this monitoring can be deposited in memory of the transaction analysis system. The transaction can then generate flow data 505 for each of the monitored transactions 510. Additionally, corresponding graphical representations of each of the flows described in the flow data 505 can be made available for rendering in a GUI. In some cases, a single flow diagram can be generated from transaction data from multiple transactions. For instance, transactions that potentially involve multiple different alternative branches can be modeled by observing multiple instances of the transactions such that the flow of each alternative branch is observed. The transaction data from these transactions can be aggregated to define a flow that considers each of the alternative branches and presents a graphical representation showing the flow within each alternative branch.

Figure 5B:
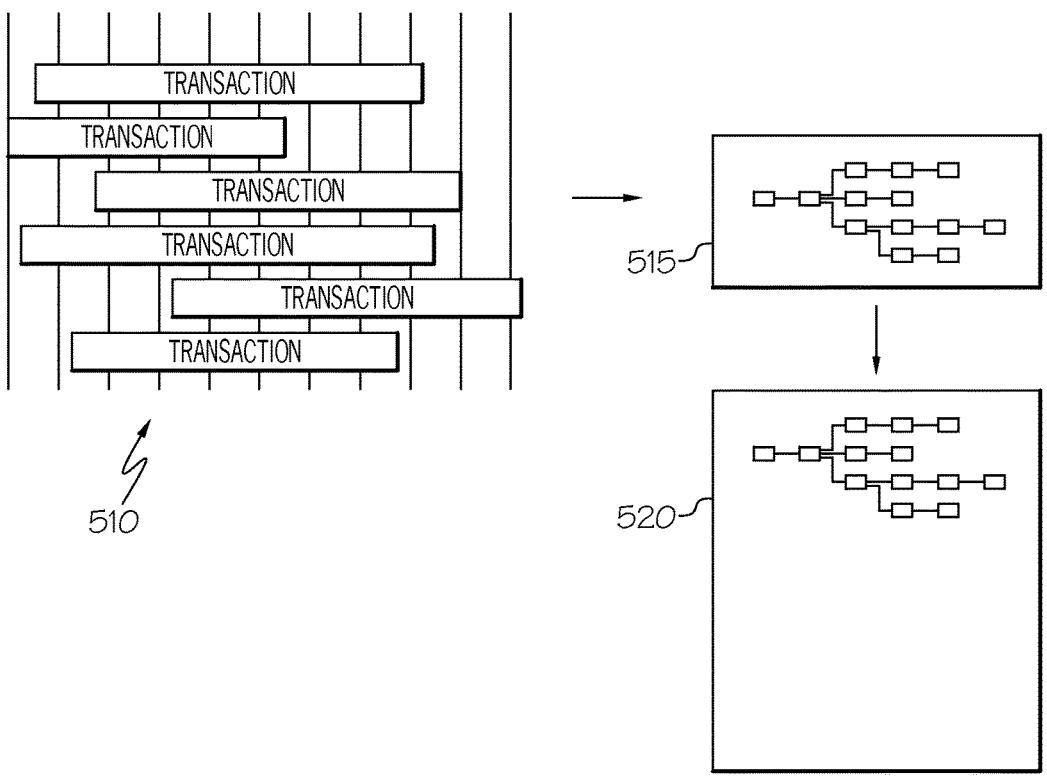

As shown in FIG. 5B, transactions 510 can include one or more transactions that have been launched (or are being monitored) in connection with a request to generate system architecture documentation from resulting transaction data generated for the transaction analysis system. Other transactions, including other transactions of the same type, may take place at the same time as the documentation-specific transaction(s). To address this, the transaction analysis system (in response to a request to generate documentation) can cause transaction data to be filtered to separate transaction data 515 for those transactions corresponding to the documentation request from all other transaction data (e.g., 505) generated during the same period (in connection with other concurrent transactions). The particular transaction data 515 may nonetheless be usable in generating general purpose flow data (e.g., for a collection or aggregation of monitored transactions), but for purposes of the document generation, the particular transaction data 515 can be isolated and used to generate corresponding system architecture documentation (e.g., 520), including graphics that represent the determined flow.

In some implementations, a request to generate system architecture documentation can include the identification of one or more specific transactions that should be launched to monitor current performance of a portion of a system. In some cases, the type of documentation requested can correspond to a defined set of transactions that is to be invoked in connection with a request to generate that type of documentation. This set of transactions can be pre-defined as associated with the document generation request such that the set of transactions is automatically selected with the document generation request. The set of transactions can be selected to include those transactions that result in the invocation of particular software components and flows. In some cases, the documentation is to pertain to a particular transaction or set of transactions. In other instances, a user, in connection with a documentation generation request, can manually select (e.g., through a GUI) which transactions should be run and considered in generating corresponding documentation. These transactions will then be automatically launched in connection with the document generation request. Additionally, a document generation request can also involve the selection of a particular one of a library of available documentation shells or templates. For instance, a particular form of documentation may be defined to be tailored to a particular organizational need or format (e.g., different from the format employed in GUI representations of transaction flows provided by the transaction analysis system). Templates can define the required format for a particular type of documentation. A documentation request can also be one of a set of predefined documentation request types, with each documentation request having an associated set of transactions to be invoked and a particular documentation template to be used. Alternatively, a user can custom define the documentation generation request by specifying a custom combination of associated transactions and documentation templates. Indeed, a GUI can be provided allowing a user to create or modify a documentation template to be used. The corresponding transactions can be run and transaction data (and path data) collected. This data can then be used to generate graphical representations of the system architecture (e.g., software component interactions and the ordering or dependencies of these interactions) and populate the corresponding documentation template to generate the system architecture documentation in response to the documentation generation request.

As noted above, collecting the transaction data for use in populating a documentation template can involve isolating the transaction data (and path data) from other transaction data generated by the transaction analysis system during a common period of time (e.g., as illustrate in FIG. 5B). In one example, a specific client or servlet can be used that is associated with the documentation generation engine or a specific documentation generation request. Address information (e.g., the corresponding remote IP address) corresponding to this client can be used as the basis for identifying that a transaction launched from or otherwise involving the client relates to a particular documentation generation request and corresponding transaction data for this transaction is to be isolated (or tagged for filtering). In other instances, a particular user session can be identified and associated with the particular documentation generation request. The session can be tracked across one or more transactions launched in connection with the documentation generation request and serve as the basis for isolating corresponding transaction data generated from monitoring the transactions.

In one example implementation, user session tracking within multiple concurrent monitored transactions can be enabled using a transaction analysis system. In one example, agents can identify that a transaction corresponds to a session, for instance, by identifying a cookie or other data within a request or response. In response, the transaction analysis system can cause transaction fragments that correspond to the identified session to be tagged (e.g., by one or more agents or a transaction path engine) to define session-based associations between transaction fragments and even between multiple different transactions (and their component fragments) identified within the session. The presence of a session can be reported by an agent to an agent manager and the agent manager can assist in associating the session with transactions during stitching of transaction data relating to each of the transaction fragments to be stitched together to define the transaction. In some cases, to assist with identification of a session, data can be artificially added to a request (or requests) intercepted by an agent to tag the request with a session identifier to assist downstream components (and corresponding agents) to identify that the request corresponds to a particular session. For instance, address data or other data that is likely to be included in each of the requests and responses of the transaction can be modified to include the session identifier. An agent can then remove the session identifier before completing the transaction (e.g., delivering result data to the requesting client or storing data in a database, etc.). This can allow the session identifier to propagate across a transaction flow to allow the transaction fragments to be more easily identified as associated with the session, among other example implementations.

Returning to the example of FIG. 6, a screenshot is shown of an example GUI 605 that can be presented in connection with a request to generate system architectural documentation in connection with a monitored transaction. For instance, a user can be provided with a window 610 that allows a user to select one or more transactions to be invoked to generate transaction data from which the documentation is to be produced. In some instances, the GUI can allow the user to define multiple instances of a single transaction, such that the transaction is run multiple times (e.g., with different commands or request attributes) to cause each of the multiple alternative transaction branches (e.g., at 645, 650) to be invoked and corresponding transaction data to be generated. In some cases, a documentation generation request can include identification of a previously-recorded transactions. Indeed, historical documentation can be generated from previously monitored transactions and corresponding transaction data (e.g., to generate documentation of a previous version of a software system).

As shown in FIG. 6, the GUI 600 can allow a user to previous graphical representations and other information generated and collected in connection with the documentation generation request. For instance, window 610 can present a graphical representation of the transaction flows that were identified from the transaction data. From this graphical representation, a user can verify that the desired information has been collected. The user can then select for the corresponding documentation to be generated, among other examples.

Figure 7A:
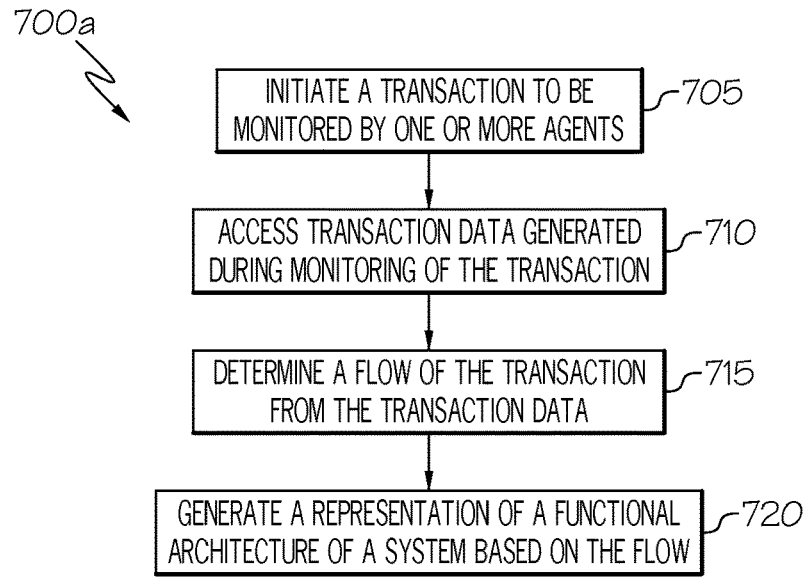
FIGS. 7A-7B are simplified flowcharts illustrating example techniques in connection with generating system architecture documentation in accordance with at least one embodiment.
Figure 7B:
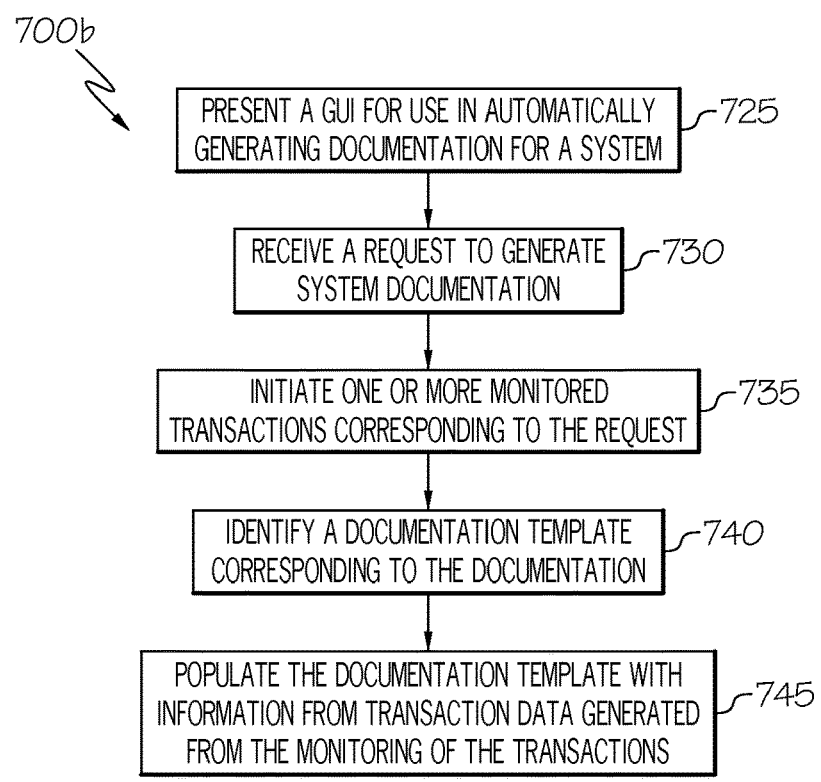

FIGS. 7A-7B are simplified flowcharts 700a-b illustrating an example technique for automatically generating representation of the functional architecture of at least a portion of a software system. For instance, in FIG. 7A, one or more transactions are initiated 705 that are to be monitored using one or more agents. The agents can generate transaction data describing the transaction and contributions of various software components of the system during the transaction. The transaction data can be accessed 710 and can be processed to identify fragments of the transactions. The fragments can be stitched together to determine 715 a flow of the transaction (which can be described in corresponding path data). The flow can be used to generate a corresponding graphical representation of the transaction(s), which can serve, at least in part, as a representation of the functional architecture of the system that performed the transaction. This graphical representation of the functional architecture of the system can be incorporated in system architecture documentation generated for the system based on the transaction data.

Turning to FIG. 7B, a GUI can be presented 725 in connection with a request to automatically generate system architectural documentation. A request to generate the documentation can be received 730 (e.g., from a user) through the GUI. In response, one or more monitored transactions can be initiated 735, which will be monitored using one or more agents. The monitoring can result in the generation of transaction data that can be processed to determine the flow(s) of the transaction(s) and generate one or more graphical representations of the transaction flow (e.g., as in the example of FIG. 7A). Further, a documentation template corresponding to the request can be identified 740 and the template can be populated 745 with information from the transaction data (as well as graphical representations of the transaction flow generated from the transaction data) to generate the system architectural documentation.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A computer-implemented method comprising:
   initiating a transaction involving a plurality of software components in a system;
   automatically identifying a request to generate documentation for the system within a particular user session;
   receiving transaction data from a plurality of agents instrumented on at least a subset of software components in the plurality of software components, wherein the transaction data describes a plurality of transactions performed using the plurality of software components and observed by the plurality of agents, the transaction data further describes attributes of a plurality of fragments of a particular one of the plurality of transactions performed within the particular user session, and each of the fragments comprises a respective request and a corresponding response communicated between two respective software components in the plurality of software components;
   automatically determining a subset of the transaction data describing the particular transaction, wherein the subset of the transaction data corresponds to the particular user session;
   automatically determining, from the subset of the transaction data, a flow of the particular transaction describing an order of the transaction fragments and involvement of respective software components in each transaction fragment; and
   automatically generating, from the subset of the transaction data, documentation describing the system, wherein the documentation comprises a representation of a functional architecture of the system based on the determined flow and is responsive to the request to generate documentation.

2. The method of claim 1, wherein the representation identifies interactions between the plurality of software components.

3. The method of claim 1, wherein the representation comprises a graphical representation.

4. The method of claim 3, wherein the graphical representation comprises graphical elements representing each of the plurality of software components and each of the transaction fragments, wherein the graphical elements representing the transaction fragments comprise respective line elements each connecting two corresponding graphical elements representing the software components involved in the corresponding transaction fragment.

5. The method of claim 4, wherein the graphical representation comprises a tree representing the flow of the transaction.

6. The method of claim 1, wherein the representation describes at least a portion of the attributes described in the transaction data.

7. The method of claim 1, further comprising receiving a request to generate the documentation, wherein the transaction is initiated based on the request.

8. The method of claim 1, wherein the transaction corresponds to the request.

9. The method of claim 8, wherein the transaction comprises a plurality of transactions related to the request.

10. The method of claim 1, further comprising identifying a documentation template corresponding to the request and using the documentation template to generate the documentation.

11. The method of claim 1, further comprising isolating the subset of transaction data from a collection of other transaction data comprising transaction data generated from the other transactions.

12. The method of claim 11, wherein isolating the transaction comprises identifying a remote IP address corresponding to the request to generate documentation for the system and filtering the collection of transaction data by the remote IP address.

13. The method of claim 11, further comprising generating a graphical representation of one of the other transactions based on the transaction data generated for the other transactions.

14. The method of claim 11, wherein the particular transaction comprises an instance of a particular transaction type and the one of the other transactions comprises another instance of the particular transaction type and a particular one of the plurality of software components is used in each of the instances of the particular transaction type.

15. A non-transitory computer readable medium having program instructions stored therein, wherein the program instructions are executable by a computer system to perform operations comprising:
  initiating a transaction involving a plurality of software components in a system;
  automatically identifying a request to generate documentation for the system within a particular user session;
  receiving transaction data from a plurality of agents instrumented on at least a subset of software components in the plurality of software components, wherein the transaction data describes a plurality of transactions performed using the plurality of software components and observed by the plurality of agents, the transaction data further describes attributes of a plurality of fragments of a particular one of the plurality of transactions performed within the particular user session, and each of the fragments comprises a respective request and a corresponding response communicated between two respective software components in the plurality of software components;
  automatically determining a subset of the transaction data describing the particular transaction, wherein the subset of the transaction data corresponds to the particular user session;
  automatically determining, from the subset of the transaction data, a flow of the transaction describing an order of the transaction fragments and involvement of respective software components in each transaction fragment; and
  automatically generating, from the subset of the transaction data, documentation describing the system, wherein the documentation comprises a representation of a functional architecture of the system based on the determined flow and is responsive to the request to generate documentation.

16. A system comprising:
  a data processing apparatus;
  a memory device;
  a software transaction analysis engine executable by the data processing apparatus to:
    initiate a transaction involving a plurality of software components in a system;
    automatically identify a request to generate documentation for the system within a particular user session;
    receive transaction data from a plurality of agents instrumented on at least a subset of software components in the plurality of software components, wherein the transaction data describes a plurality of transactions performed using the plurality of software components and observed by the plurality of agents, the transaction data further describes attributes of a plurality of fragments of a particular one of the plurality of transactions performed within the particular user session, and each of the fragments comprises a respective request and a corresponding response communicated between two respective software components in the plurality of software components;
    automatically determine a subset of the transaction data describing the particular transaction, wherein the subset of the transaction data corresponds to the particular user session; and
    automatically determine, from the subset of the transaction data, a flow of the particular transaction describing an order of the transaction fragments and involvement of respective software components in each transaction fragment; and
  a documentation generator executable by the data processing apparatus to automatically generate, from the subset of the transaction data, documentation describing the system, wherein the documentation comprises a representation of a functional architecture of the system based on the determined flow and is responsive to the request to generate documentation.

17. The system of claim 16, wherein the documentation generator is further to identify a particular one of a plurality of documentation templates and populate the particular documentation template with information from the transaction data to generate the documentation.

18. The system of claim 17, wherein the representation comprises a graphical representation and the particular documentation template is populated to include the graphical representation.

* * * * *